(12) United States Patent
Nagaoka et al.

(10) Patent No.: US 7,885,430 B2
(45) Date of Patent: Feb. 8, 2011

(54) AUTOMOTIVE ENVIRONMENT MONITORING DEVICE, VEHICLE WITH THE AUTOMOTIVE ENVIRONMENT MONITORING DEVICE, AND AUTOMOTIVE ENVIRONMENT MONITORING PROGRAM

(75) Inventors: Nobuharu Nagaoka, Wako (JP); Makoto Aimura, Wako (JP); Masakazu Saka, Wako (JP); Takayuki Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 548 days.

(21) Appl. No.: 12/080,906

(22) Filed: Apr. 7, 2008

(65) Prior Publication Data
US 2008/0260208 A1    Oct. 23, 2008

(30) Foreign Application Priority Data
Apr. 20, 2007    (JP) .............................. 2007-111161

(51) Int. Cl.
G06K 9/00    (2006.01)
G06K 9/46    (2006.01)
G08G 1/16    (2006.01)

(52) U.S. Cl. ........................ 382/104; 382/103; 382/190; 701/301

(58) Field of Classification Search ................. 382/104, 382/190, 103; 701/301
See application file for complete search history.

(56) References Cited

U.S. PATENT DOCUMENTS 7,330,567 B2 * 2/2008 Hong et al. .................. 382/103

2001/0028729 A1    10/2001 Nishigaki et al.
2004/0108157 A1 *  6/2004 Takafuji et al. ............. 180/274

(Continued)

FOREIGN PATENT DOCUMENTS

EP    0 361 914 A2    4/1990

(Continued)

OTHER PUBLICATIONS

A. Broggi et al., "Shape-based Pedestrian Detection", Proceedings of the IEEE Inteligent Vehicles Symposium 2000, Dearborn (MI), USA—Oct. 3-5, 2000.

*Primary Examiner*—Wenpeng Chen
(74) *Attorney, Agent, or Firm*—Carrier Blackman & Associates, P.C.; Joseph P. Carrier; William D. Blackman

(57) ABSTRACT

The present invention provides an automotive environment monitoring device to detect the existence of an object, a pedestrian or the like, with high accuracy even if one part of the object is overlapped with the background of an image obtained from an imaging unit mounted on the vehicle. An area where the object exists in the image obtained from an infrared camera (102) is set as a first area ($A_{1i}$) and a lower portion of the first area ($A_{1i}$) is set as a second area ($A_{2i}$). A feature of the object is extracted with respect to the second area ($A_{2i}$) and the object is identified based on the extracted feature. Thereby, even in the case where the first area ($A_{1i}$) has been set but the feature of an upper part of the object can not be extracted due to the upper part of the object being overlapped with the background of the image, the object can still be identified with high accuracy by extracting the feature of a lower part of the object in the second area ($A_{2i}$).

9 Claims, 8 Drawing Sheets

U.S. PATENT DOCUMENTS

| | | | |
|---|---|---|---|
| 2005/0036688 A1* | 2/2005 | Froeba et al. | 382/199 |
| 2005/0285966 A1* | 12/2005 | Bamji et al. | 348/336 |
| 2006/0104480 A1* | 5/2006 | Fleisher | 382/103 |
| 2006/0115115 A1 | 6/2006 | Nagaoka et al. | |
| 2006/0115116 A1* | 6/2006 | Iwasaki et al. | 382/103 |
| 2006/0120564 A1* | 6/2006 | Imagawa et al. | 382/103 |
| 2006/0262857 A1* | 11/2006 | Iwasaki et al. | 375/240.19 |
| 2009/0010495 A1* | 1/2009 | Schamp et al. | 382/106 |

FOREIGN PATENT DOCUMENTS

| | | |
|---|---|---|
| JP | 07-220046 | 8/1995 |
| JP | 2001-006096 | 1/2001 |
| JP | 2003-216937 | 7/2003 |
| JP | 2005-354597 | 12/2005 |
| JP | 2006155388 A * | 6/2006 |
| WO | WO 2006/014974 A2 | 2/2006 |

* cited by examiner

AUTOMOTIVE ENVIRONMENT MONITORING DEVICE, VEHICLE WITH THE AUTOMOTIVE ENVIRONMENT MONITORING DEVICE, AND AUTOMOTIVE ENVIRONMENT MONITORING PROGRAM

BACKGROUND OF THE INVENTION

1. Field of the Invention

The present invention relates to an automotive environment monitoring device which monitors an environment of a vehicle by using an image obtained from an imaging unit mounted on the vehicle.

2. Description of the Related Art

Concerning a technology for identifying an object, a pedestrian or the like, which has a possibility to contact a vehicle, on the basis of an image of environment of the vehicle photographed with an infrared camera mounted on the vehicle, there has been disclosed an invention, for example, in Japanese Patent Laid-open No. 2001-6096.

However, according to the above mentioned invention, in the case where the head, the body or the like of the pedestrian is overlapped with a building in the background of the image, it is difficult to determine the existence of the pedestrian.

SUMMARY OF THE INVENTION

The present invention has been accomplished in view of the aforementioned problem, and it is therefore an objective of the present invention to provide an automotive environment monitoring device to detect the existence of an object with high accuracy even if one part of the object, for example a pedestrian or the like, is overlapped with the background of an image obtained from an imaging unit mounted on the vehicle.

The automotive environment monitoring device of a first aspect of the present invention includes a first processing element (also referred as a first processing unit), which sets an area where an object exists in the image obtained from the imaging unit as a first area and a lower portion of the first area as a second area; a second processing element (also referred as a second processing unit) which extracts a feature of the object in the second area set by the first processing element; and a third processing element (also referred as a first processing unit) which identifies the object on the basis of an extraction result by the second processing element.

According the automotive environment monitoring device of the first aspect of the present invention, the area where the object exists in the image obtained from the imaging unit is set as the first area and the lower portion of the first area containing a lower part of the object is set as the second area. Thereby, even in the case where the first area has been set but the feature of an upper part of the object can not be extracted due to the upper part of the object being overlapped with the background of the image, the object can still be identified with high accuracy by extracting the feature of the lower part of the object in the second area.

The automotive environment monitoring device of a second aspect of the present invention includes the automotive environment monitoring device of the first aspect of the present invention, wherein the first processing element determines a distance from the vehicle to the object; and the second processing element extracts the feature of the object on a condition that the determined distance by the first processing element is in a given distance range.

According to the automotive environment monitoring device of the second aspect of the present invention, by considering the determined distance from the vehicle to the object, it is possible to omit the extraction on a feature of an object which has high probability of being different from the object to be identified and identification thereof. Accordingly, it is capable to perform the feature extraction and identification on the object economically.

The automotive environment monitoring device of a third aspect of the present invention includes the automotive environment monitoring device of the first aspect of the present invention, wherein the first processing element determines a height from a road surface to the lower end of the first area or the second area where the object exists; and the second processing element extracts the feature of the object on a condition that the determined height by the first processing element is in a given height range.

According to the automotive environment monitoring device of the third aspect of the present invention, by considering the position of the lower end of the first area or the second area with the road surface as reference, it is possible to omit the extraction on a feature of an object which has high probability of being different from the identification object. Accordingly, it is capable to perform the feature extraction and identification on the object economically.

The automotive environment monitoring device of a fourth aspect of the present invention includes the automotive environment monitoring device of the first aspect of the present invention, wherein the second processing element extracts a positive or negative edge line, and a length of the respective positive or negative edge line of the object in the second area set by the first processing element as the feature of the object; and the third processing element identifies the object as a human on a condition that at least three edge lines with the length in a first length range are extracted by the second processing element.

According to the automotive environment monitoring device of the fourth aspect of the present invention, in the case where a human (pedestrian) is included in the image obtained from the imaging unit, normally two positive edge lines or negative edge lines representing two human legs are detected in the second area, however, by considering the length of the respective positive edge lines, it is possible to identify a human and the other objects even though three or more than three positive edge lines are detected. Thereby, even in the case where additional positive edge lines, other than the two edge lines representing two human legs, are detected due to a reason that a building or the like is visible from a clearance between the two legs in the image or the like, it is possible to identify a human and the other objects with high accuracy. In addition, "a positive edge line" here refers to a collection of continuous positive edge points over a given number of lines in a vertical direction, and "a negative edge line" refers to a collection of continuous negative edge points over a given number of lines in a vertical direction. "Continuous points in a vertical direction" means that a horizontal deviation between the points in adjacent lines along the vertical direction is equal to or less than a threshold value. "A positive edge point" refers to a point whose luminance along the horizontal direction in the image surpasses a threshold value. "A negative edge point" refers to a point whose luminance along the horizontal direction in the image is equal to or less than the threshold value.

The automotive environment monitoring device of a fifth aspect of the present invention includes the automotive environment monitoring device of the first aspect of the present invention, wherein the second processing element extracts an edge line, a length of the edge line, and an upper horizontal interval and a lower horizontal interval between two edge lines of the object in the second area set by the first processing element as the feature of the object; and the third processing element identifies the object as a human on a condition that two edge lines with the length in a second length range and with a deviation between the upper horizontal interval and the lower horizontal interval in a given deviation range with a positive lower limit are extracted by the second processing element.

According to the automotive environment monitoring device of the fifth aspect of the present invention, it is possible to identify a human and the other objects with high precision by considering the following aspects: (1) a human has two legs; (2) standard length of a human leg; and (3) when a human is viewed from a front side, with respect to human legs, an interval in a lower position tends to be narrower than that in an upper position.

The automotive environment monitoring device of a sixth aspect of the present invention includes the automotive environment monitoring device of the fifth aspect of the present invention, wherein the second processing element determines a total number of edge points constituting the two edge lines as the length of the two edge lines, respectively; and an average horizontal interval between edge points of the same height constituting the two edge lines in the upper and lower portion of the second area are determined as the upper horizontal interval and the lower horizontal interval of the two edge lines, respectively.

According to the automotive environment monitoring device of the sixth aspect of the present invention, even in the case where the edge points constituting the edge lines are distributed by spreading over the horizontal direction in the image due to an inclined positioning of the edge lines, it is possible to determine the size of the respective edge line by accumulating the numbers of the edge points. Accordingly, a tendency that an interval between a pair of edge lines becomes narrower toward the downside direction may be determined by comparing the average intervals in the horizontal direction of the upper part and the lower part of the edge lines, respectively.

The automotive environment monitoring device of a seventh aspect of the present invention includes the automotive environment monitoring device of the first aspect of the present invention, wherein the second processing element extracts a peak luminance line in the second area set by the first processing element and a horizontal interval between two peak luminance lines; and the third processing element identifies the object as a human on a condition that the horizontal interval between the two peak luminance lines in a given interval range are extracted by the second processing element.

According to the automotive environment monitoring device of the seventh aspect of the present invention, it is possible to identify a human and the other objects with high precision by considering the interval between two peak luminance lines and a standard interval between two human legs. In addition, "a peak luminance line" refers to a collection of continuous points of peak luminance across a given number of lines in a vertical direction. "A peak luminance point" represents a point with the highest luminance within a zone formed from points with luminance surpassed the threshold value to points with luminance dropped to the threshold value again along the horizontal direction in the image obtained from the imaging unit.

The vehicle of an eighth aspect of the present invention includes the imaging unit and the automotive environment monitoring device of the first aspect of the present invention.

According to the vehicle of the eighth aspect of the present invention, even in the case where the first area has been set but the feature of the upper part of the object can not be extracted due to the upper part of the object being overlapped with the background of the image, the object can still be identified by extracting the feature of the lower part of the object in the second area. Thereby, the vehicle can be operated appropriately by considering the identification result on the object.

The automotive obstacle detection program of a ninth aspect of the present invention causes a computer mounted on a vehicle to function as the automotive environment monitoring device.

According to the automotive obstacle detection program of the ninth aspect of the present invention, even in the case where the first area has been set but the feature of the upper part of the object can not be extracted due to the upper part of the object being overlapped with the background of the image, the program can still cause the computer to identify the object by extracting the feature of the lower part of the object in the second area.

DETAILED DESCRIPTION OF THE PREFERRED EMBODIMENTS

Hereinafter, an embodiment of an automotive environment monitoring device and the like will be described with reference to the drawings.

Figure 1:
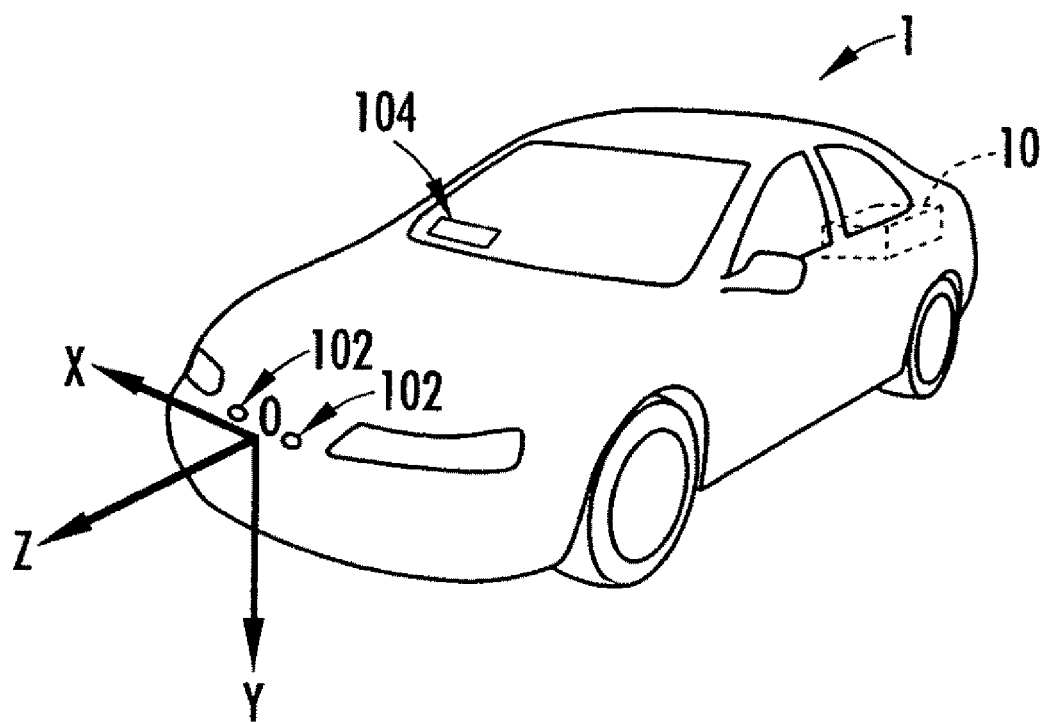
FIG. 1 is an explanatory diagram illustrating a configuration of a vehicle according to an embodiment of the present invention.
Figure 2:
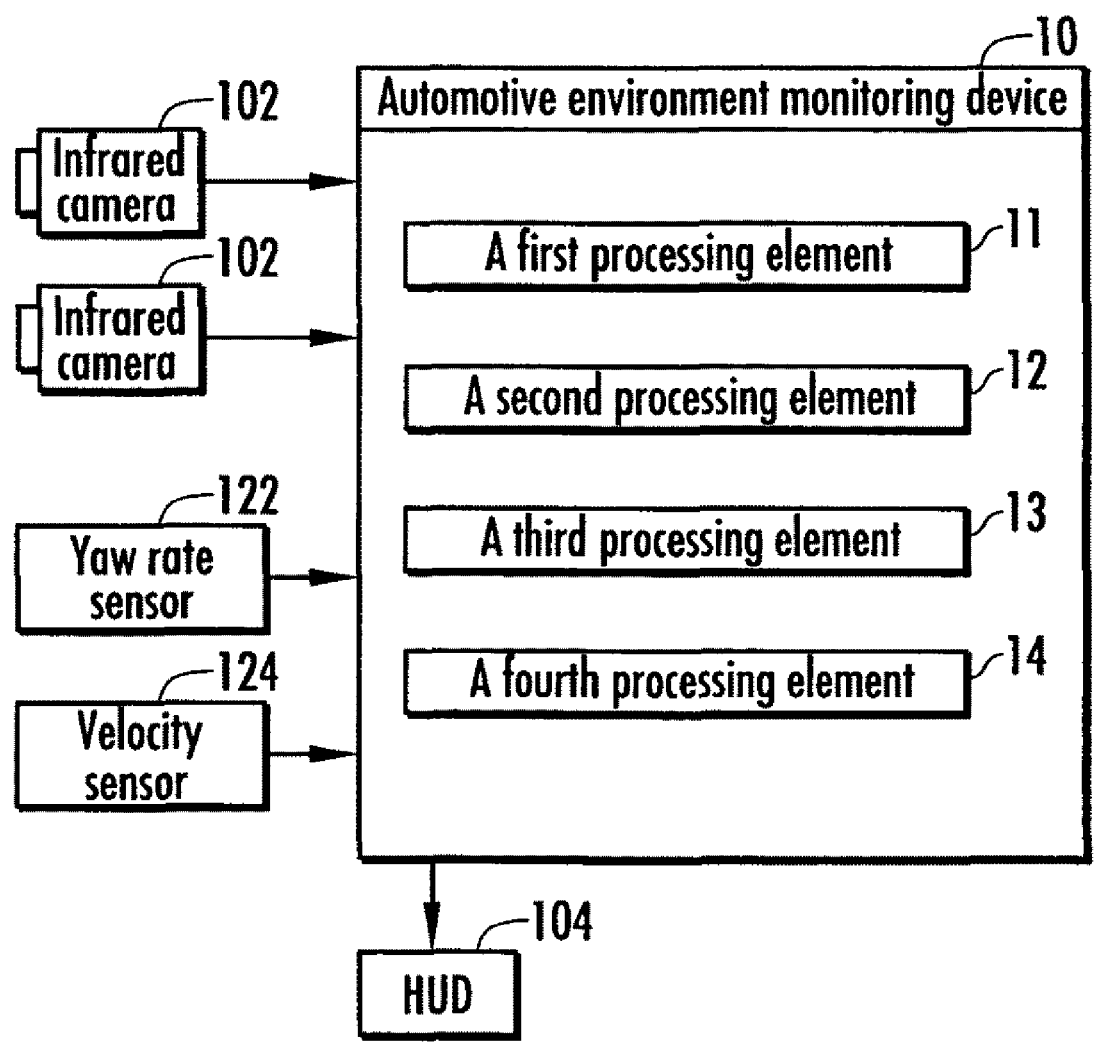
FIG. 2 is an explanatory diagram illustrating a configuration of an automotive environment monitoring device according to an embodiment of the present invention.

A vehicle 1 as illustrated in FIG. 1 is provided with the automotive environment monitoring device 10, a pair of infrared cameras (imaging units) 102 disposed in a front end of the vehicle 1 substantially symmetrical to the center portion in the width direction, and a HUD (head-up display) 104 disposed in a front window without interfering vision of a driver. As illustrated in FIG. 2, the vehicle 1 is additionally mounted thereon with various sensors, such as a yaw rate sensor 122, a velocity sensor 124 and others.

The automotive environment monitoring device 10 monitors the environment of the vehicle 1 according to an image obtained from the vehicular infrared cameras 102. The automotive environment monitoring device 10 is constituted from an ECU (electric control unit) or a computer (formed from CPU, ROM, RAM, I/O and others) as a hardware mounted on the vehicle 1, and an automotive obstacle detection program of the present invention as a software stored in a memory for endowing the computer with various functions. In addition, the automotive obstacle detection program may be initially stored in a memory (ROM) of the computer. Though not illustrated in the drawings, it is also possible for the program to be distributed or broadcasted partially or entirely from a server to the vehicular computer via a network or a satellite at arbitrary time such as when there is a request from the vehicular computer. The automotive environment monitoring device 10 may be constituted from one ECU; it may also be formed from a plurality of ECUs constituting a distributed control system.

The automotive environment monitoring device 10, as illustrated in FIG. 2, includes a first processing element 11 (also referred as a first processing unit 11), a second processing element 12 (also referred as a second processing unit 12), a third processing element 13 (also referred as a third processing unit 13), and a fourth processing element 14 (also referred as a fourth processing unit 14).

The first processing element 11 sets an area where an object exists in the image obtained from the infrared cameras 102 as a first area $A_{1i}$ (i=1, 2, . . . ), and a lower portion of the first area $A_{1i}$ as a second area $A_{2i}$.

The second processing element 12 detects an edge line EL and a line of high luminance PL as a feature quantity of the object contained in the second area $A_{2i}$, and then measures the feature quantity or the like of the detected line.

The third processing element 13 identifies the object based on an extraction result on the feature quantity performed by the second processing element 12.

The fourth processing element 14 evaluates, if necessary, contact possibility between the vehicle 1 and the identified object based on the identification result of the object performed by the third processing element 13. Thereafter, the fourth processing element 14 controls operations of the vehicular apparatuses by notifying the existence of the object ahead of the vehicle 1, or displaying an emphasized image on HUD 104, or the like.

Hereinafter, there will be described functions of the vehicle 1 and the automotive environment monitoring device 10 with the above mentioned configuration.

Figure 3:
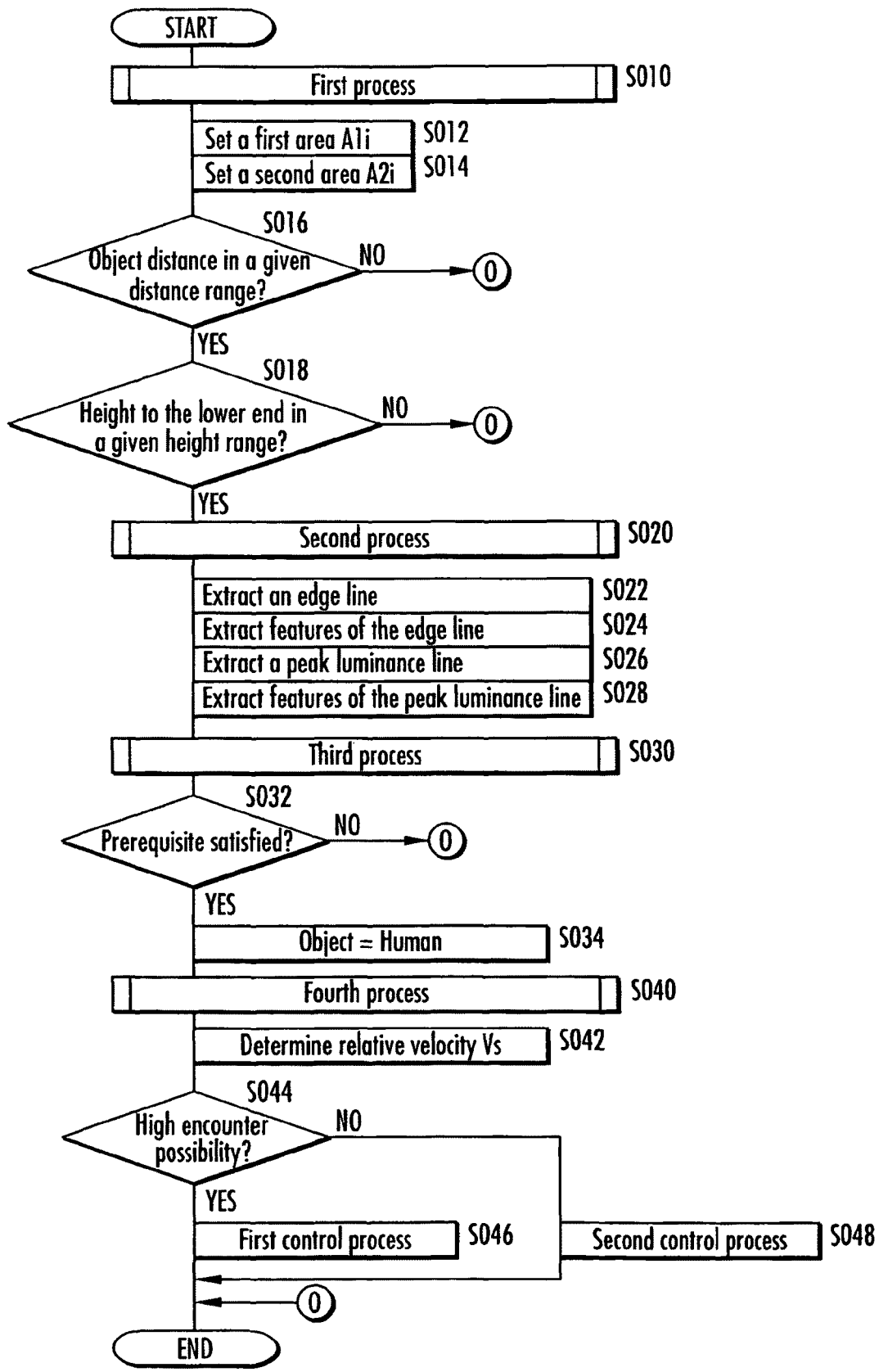
FIG. 3 is a flow chart illustrating functions of the automotive environment monitoring device according to an embodiment of the present invention.

A first process is performed by the first processing element 11 (S010 in FIG. 3). As a result, an area where an object exists in a grayscale image obtained by A/D conversion of the infrared image taken by the pair of infrared cameras 102 is set as the first area $A_{1i}$ (i=1, 2, . . . ) (S012 in FIG. 3).

Figure 4D:
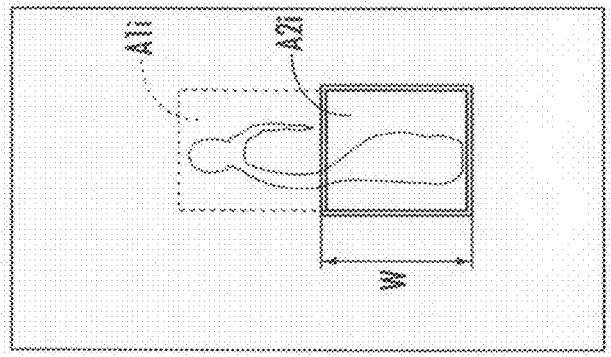
FIGS. 4(a) to 4(d) are explanatory diagrams concerning a method for setting a first area and a second area.
Figure 4C:
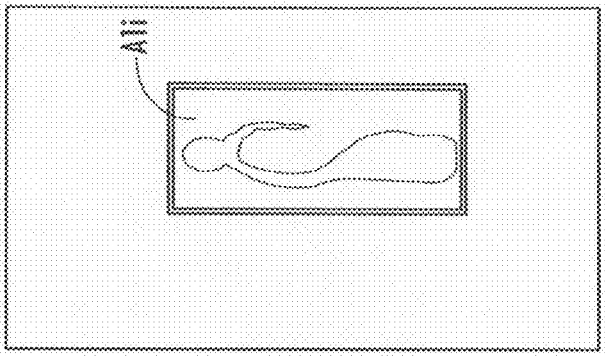
Figure 4B:
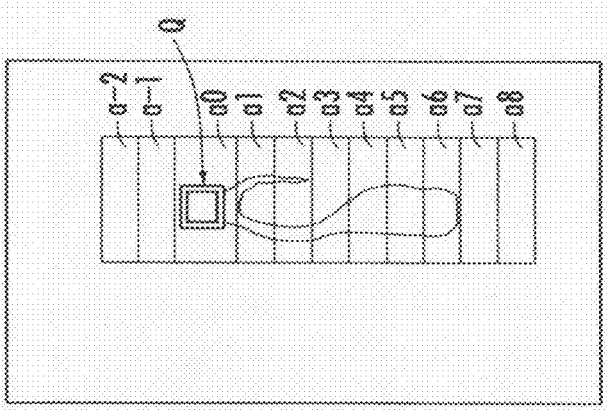
Figure 4A:
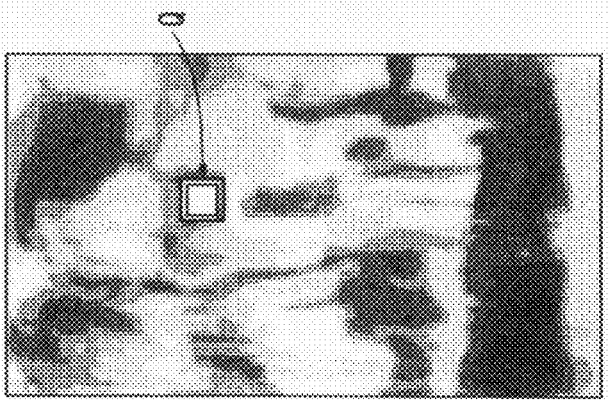

In the case where a partial grayscale image as illustrated in FIG. 4(a) is obtained, an area Q of high luminance (framed with double lines) is extracted therefrom. Next, as illustrated in FIG. 4(b), in addition to a small area $a_0$ having a rectangular shape and including therein the high luminance area Q, a plurality of small areas $a_{-2}$, $a_{-1}$, $a_1$ to $a_8$ having the same rectangular shape as the small area $a_0$ are set in a row containing therein the small area $a_0$ along a vertical direction. Furthermore, a position, such as the center of gravity, of each of the small areas $a_k$ (k=2 to 8) in real space is determined by using the disparity of the pair of infrared cameras 102. At this moment, a positional deviation in the image caused by the turning of the vehicle 1 is corrected based on outputs of the yaw rate sensor 122 and the velocity sensor 124, respectively. The position with turning angle corrected in real space is stored in the memory. "A position in real space" refers to a position in a coordinate system having an origin O at the center of the attachment positions of the pair of infrared cameras 102 as illustrated in FIG. 1, X axis in the horizontal direction, Y axis in the vertical direction and Z axis in the anteroposterior direction. Detailed explanations on the determination method of real space position and the correction method of turning angle are omitted in the description of the present application since they have been described, for example, in the afore mentioned patent document: Japanese Patent Laid-open No. 2001-6096. A collection of the plurality of continuous small areas $a_k$, each having a distance from the vehicle 1 to the area of high luminance contained in each of the small areas $a_k$ within a universal distance range, is set as the first area $A_{1i}$. Accordingly, as illustrated in FIG. 4(c), the first area (enclosed with double lines) $A_{1i}=\{a_k|k=0\text{-}6\}$ is set. The collection of areas of high luminance included in the first area $A_{1i}$ is identified as the object.

The lower portion of the first area $A_{1i}$ is set as the second area $A_{2i}$ (S014 in FIG. 3). Accordingly, as illustrated in FIG. 4(d), the lower portion of the first area $A_{1i}$ having a rectangular shape (enclosed with dashed lines) is set as the second area $A_{2i}$ having a rectangular shape (enclosed with double lines). In the image, the lower end of the second area $A_{2i}$ is set at the same height as the lower end of the first area $A_{1i}$. The width W of the second area $A_{2i}$ in the vertical direction is set in such a way that a vertical width of the area of high luminance in real space contained in the second area $A_{2i}$ matches a given interval (for example, a standard length of a human leg). Note, however, that the lower portion of the first area $A_{1i}$ is set as the second area $A_{2i}$ on a condition that the distance from the vehicle 1 to the object contained in the first area $A_{1i}$ is in a given distance range.

Next, whether the distance from the vehicle 1 to the object contained in the second area $A_{2i}$ is in the given distance range is determined (S016 in FIG. 3). If the determination result is positive (that is, YES in S016), then whether the height from a road surface to the lower end of the second area $A_{2i}$ is in a given height range is determined (S018 in FIG. 3). If the determination result is positive (that is, YES in S018), a second process which will be described hereinafter is performed. On the other hand, if one of the above two determination results is negative (that is, NO in S016 or NO in S018), the second process or the like will not be performed. The distance from the vehicle 1 to the object and the height from the road surface to the lower end of the second area $A_{2i}$ are calculated based on the real spatial positions, which are stored in the memory, of areas of high luminance representing the object, respectively.

Figure 5A:
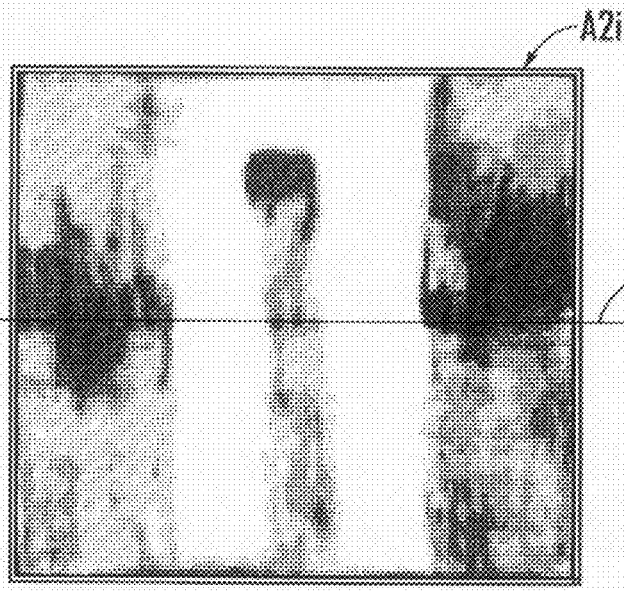
FIGS. 5(a) to 5(b) are explanatory diagrams illustrating one way to determine an edge line.
Figure 5B:
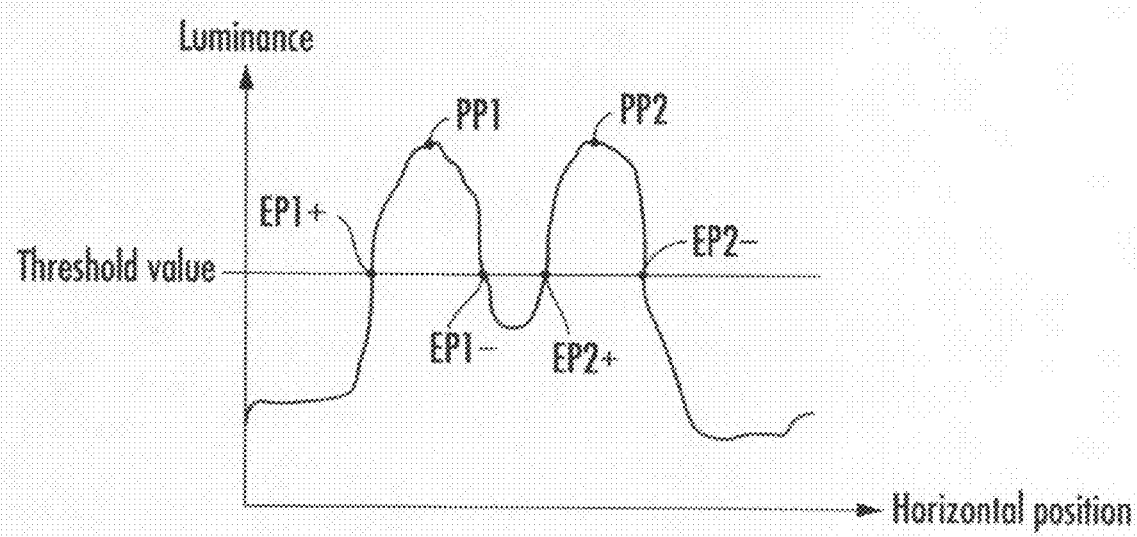

Thereafter, the second process is performed by the second processing element 12 to extract features of the object contained in the respective second area $A_{2i}$ which is set by the first processing element 1, on a condition that the above two determination results are positive (S020 in FIG. 3). More specifically, edge lines are extracted in the second area $A_{2i}$ (S024 in FIG. 3). Along a scanning line in the horizontal direction of the second area $A_{2i}$, positive edge points whose luminance surpass a threshold value and negative edge points whose luminance are equal to or less than the threshold value are extracted. As an example, a situation where luminance, as illustrated in FIG. 5(b), varies along a scanning line, which is constituted by a plurality of pixels arranged horizontally, in the second area $A_{2i}$ as illustrated in FIG. 5(a) will be considered. In this case, two positive edge points of $EP_1^+$ and $EP_2^+$ whose luminance surpass the threshold value, and two negative edge points of $EP_1^-$ and $EP_2^-$ whose luminance are equal to or less than the threshold value are detected. Thus, a collection of continuous positive edge points $EP_m^+$ (m=1, 2) across a given number of lines or more in the vertical direction are detected as an edge line $EL_m^+$. Similarly, a collection of continuous negative edge points $EP_n^-$ (n=1, 2) across a given number of lines or more in the vertical direction are detected as an edge line $EL_n^-$. Herein, "a continuous point in the vertical direction" means that a deviation (numbers of pixels)

of a point in the horizontal direction between adjacent lines (pixel row) in the vertical direction of the image is not more than a threshold value.

Figure 6A:
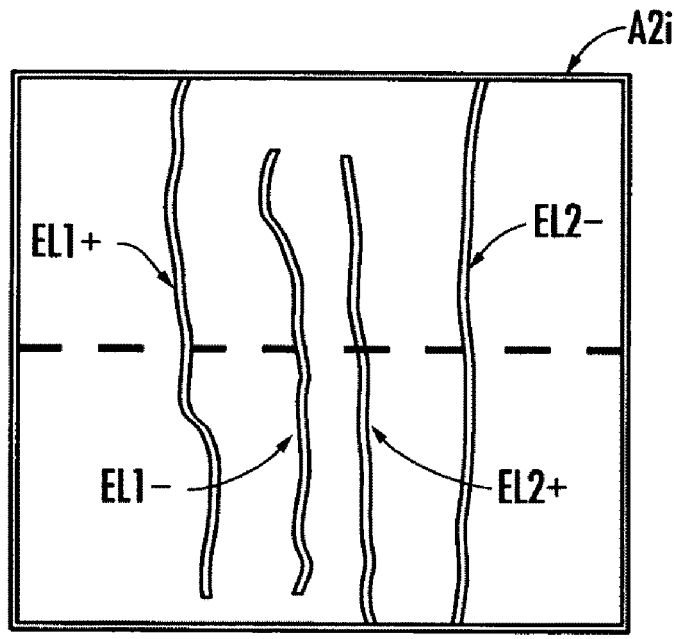
FIGS. 6(a) to 6(b) are explanatory diagrams illustrating another way to determine an edge line.
Figure 6B:
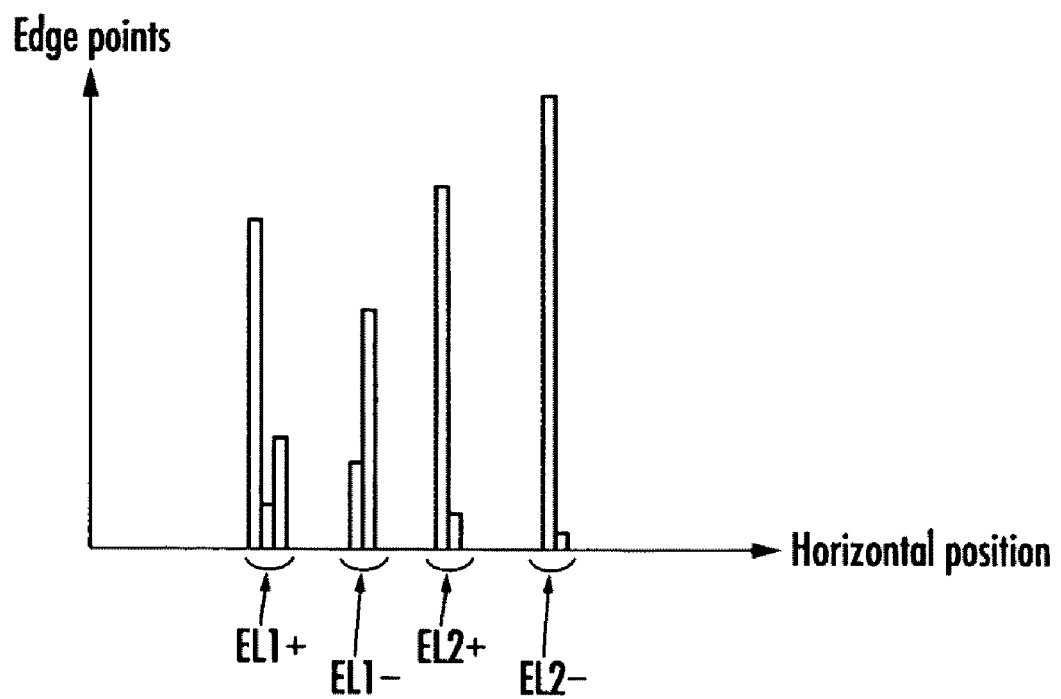

Then, the feature quantities of the edge lines are determined, respectively (S024 in FIG. 3). A sum of numbers of the edge points constituting each edge line is determined as the length of each edge line. As an example, as illustrated in FIG. 6(a), two positive edge lines of $EL_1^+$ and $EL_2^+$, and two negative edge lines of $EL_1^-$ and $EL_2^-$ are detected, whose edge point numbers of the respective columns are distributed in the horizontal direction of the image as illustrated in FIG. 6(b), will be considered. In the distribution graph, a local distribution graph collected with locally adjacent or proximal graphs is considered to represent the distribution of the edge points constituting one edge line. The sum of numbers of the edge points constituting the local distribution graph is determined as the length of each edge line in the image. The length of edge line in real space is calculated by calculating a length in real space per pixel in the second area $A_{2i}$ on the basis of the determination result of the object in real space which has been stored in the memory. In addition, it is also possible to determine a distance between the upper end point and the lower end point of an edge line as the length of the edge line.

In the case where plural edge lines are detected, the upper horizontal interval and the lower horizontal interval between two edge lines are measured. As illustrated in FIG. 6(a), an average horizontal interval of edge points with the same height constituting the two edge lines in the upper portion of the second area $A_{2i}$ sectioned by a dashed line is measured as the upper horizontal interval between the two edge lines. Similarly, an average horizontal interval between two edge lines in the lower portion of the second area $A_{2i}$ is measured as the lower horizontal interval between the two edge lines.

Next, the peak luminance line in the second area $A_{2i}$ is extracted (S026 in FIG. 3). For example, as illustrated in FIG. 5(b), for the edge points having luminance in a range varying from luminance surpassed the threshold value to luminance dropped equal to or below the threshold value along each scanning line in the second area $A_{2i}$, two points of peak luminance, which have the highest luminance, $PP_1$ and $PP_2$ are detected. As a result, a collection of the points of peak luminance having continuity in the vertical direction is detected as the peak luminance line.

Thereafter, a feature quantity of the peak luminance line is extracted (S028 in FIG. 3). In detail, a length of the peak luminance line in real space is determined. In addition, in the case where plural peak luminance lines are detected, a horizontal interval between two arbitrary peak luminance lines among the plural peak luminance lines in real space is determined. The length and the horizontal interval of the peak luminance line of the object may be determined according to the real spatial position of the object stored in the memory.

In the following, a third process is performed by the third processing element 13 to identify the object based on the extraction result on the feature of the object which is implemented by the second processing element 12 (S030 in FIG. 3). More specifically, whether any one of the three conditions listed in the following is satisfied is determined (S032 in FIG. 3):

a first condition: in the second area $A_{2i}$, at least three positive or negative edge lines having a length in a first length range are extracted;

a second condition: in the second area $A_{2i}$, two edge lines with the length in a second length range and with a deviation between the upper horizontal interval and the lower horizontal interval in a given deviation range with a positive lower limit are extracted;

a third condition: in the second area $A_{2i}$, two peak luminance lines having the horizontal interval in a given interval range are extracted.

In the case where at least one of the first to the third conditions is satisfied (YES in S032 in FIG. 3), the object is identified as a human (S034 in FIG. 3).

On the other hand, in the case where none of the first to the third conditions is satisfied (NO in S032 in FIG. 3), the object is identified as an object other than a human. In this case, it is also possible to identify the object as a vehicle, a building or the like if there is obtained a positive determination result on whether there are plural edge lines having a given arrangement relationship in the second area $A_{2i}$, or whether other conditions different to the first to the third conditions are satisfied further.

Moreover, a fourth process performed by the fourth processing element 14 is implemented to control a vehicular apparatus based on the identification result by the third processing element 13 (S040 in FIG. 3). More specifically, a time series of determined positions of an object identified as a human is retrieved from a memory, and a relative velocity (including magnitude and direction) with relation to the object is calculated based on the retrieved data (S042 in FIG. 3).

Figure 7:
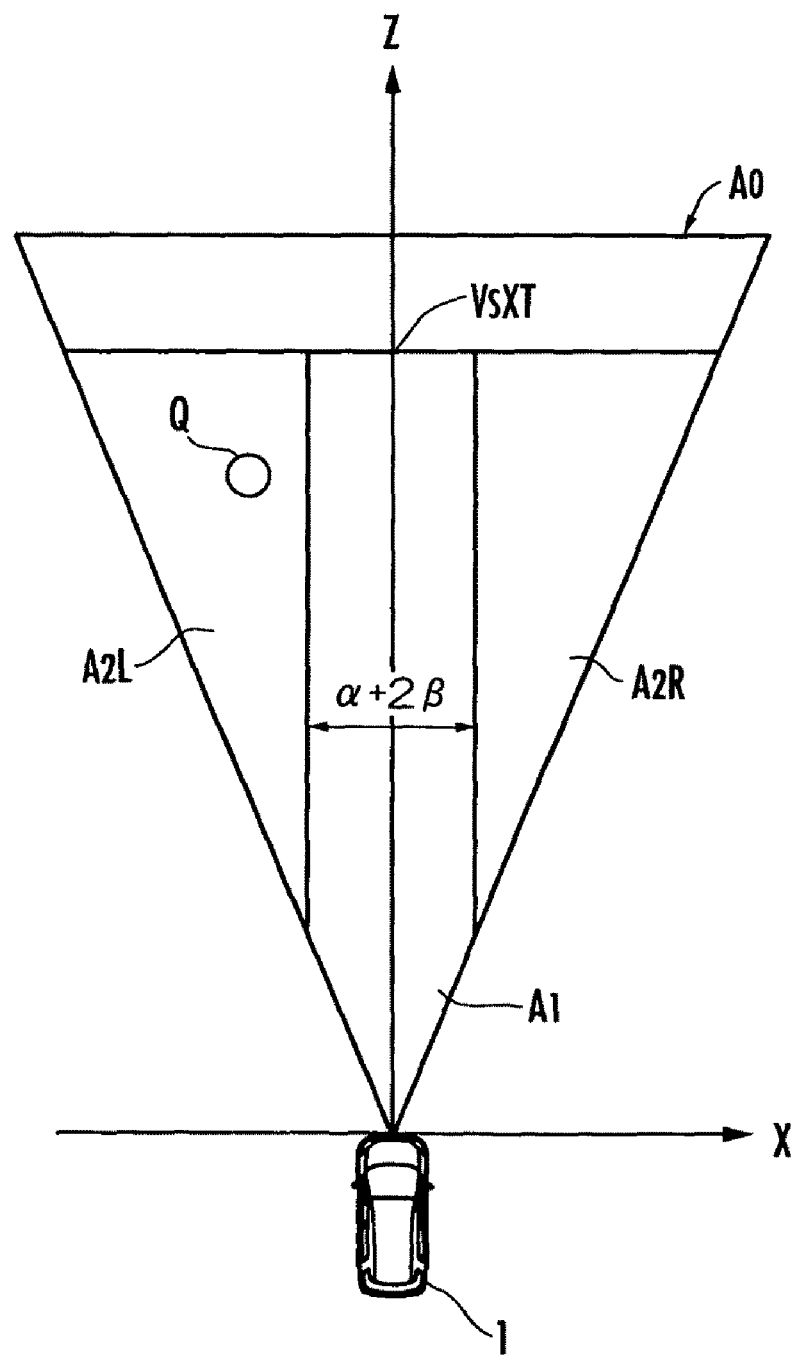
FIG. 7 is an explanatory diagram illustrating a determination method to determine contact possibility between the vehicle and an object.

Then degree of contact possibility between the vehicle 1 and the object is determined (S044 in FIG. 3). For example, as illustrated in FIG. 7, compared to a triangular area $A_0$ which is possible be monitored by the infrared cameras 102, a triangular area (alert determining area) which has a smaller size than that of the triangular area $A_0$ and a height of Vs·T (Vs times T) lower than that of the triangular area $A_0$ in Z axis is defined. Herein, Vs represents a relative velocity of an object x, such as a two-wheeled vehicle or the like, with respect to the vehicle 1; and T represents an available time. Among the triangular area, there are additionally defined a first area (approaching determining area) $A_1$ which is centered at Z axis and has a width of α+2β (α: width of vehicle, β: width of clearance) along X axis, a pair of second areas (intrusion determining areas) $A_{2L}$ and $A_{2R}$ on either side of first area $A_1$. Thereby, in the case where the object x is in the first area $A_1$ or $A_2$ on either side of $A_1$, when the object x is predicted to have a tendency to intrude into the first area $A_1$ by considering the relative speed vector Vs thereof, it is determined that the object x and the vehicle 1 have a high contact possibility.

In the case where it is determined that the object x and the vehicle 1 have a high contact possibility (YES in S044 in FIG. 3), a first control process is performed (S046 in FIG. 3). Accordingly, in order to emphasize the existence of the object, for example an orange frame encircling the object is displayed on HUD 104 as a first information. In addition, it is also possible to output bleep sounds like "beep, beep, beep" or the others via a speaker (not shown) as the first information.

On the other hand, in the case where it is determined that the object x and the vehicle 1 have a low contact possibility (a NO in S044 in FIG. 3), a second control process is performed (S048 in FIG. 3). Accordingly, in order to indicate clearly the existence of the object, for example a yellow frame encircling the object is displayed on HUD 104 as a second information. In addition, it is also possible to output beep sounds or the others which are shorter or of lower volume than that used as the first information via a speaker (not shown) as the second information.

According to the automotive environment monitoring device 10 of the present invention which have the above mentioned functions, in the image obtained from the infrared cameras 102 (imaging unit), the area where the object exists is defined as the first area $A_{1i}$, the lower portion of the first area $A_{1i}$ including the lower part of the object is defined as the second area $A_{2i}$ (refer to S012, S014 in FIG. 3 and FIG. 4(a) to FIG. 4(d)). Thereby, even in the case where the area where the object exists has been set as the first area $A_{1i}$ but the feature of the upper part of the object can not be extracted due to the upper part of the object being overlapped with the background of the image, the object can still be identified by extracting the feature of the lower part of the object such as human legs or the like in the second area $A_{2i}$.

In addition, processes including the second process and the subsequent processes thereof are performed (refer to S016, S018 in FIG. 3), on a condition that the determined distance from the vehicle 1 to the object is in the given distance range and the determined height from the lower portion of the second area $A_{2i}$ to the road surface is in the given height range. Therefore, by considering the determined distance from the vehicle 1 to the object and the position of the lower portion of the second area $A_{2i}$ (consequently the position of the lower part of the object), it is possible to omit extraction of feature and identification on an object which has a high probability to be different from the object to be identified. Accordingly, it is capable to perform the feature extraction and identification on the object economically.

Further, in the case where the first condition, at least three positive or negative edge lines having a length in the first length range are extracted in the second area $A_{2i}$, is satisfied, the object is identified as a human. Accordingly, in the case where a human (pedestrian) is included in the image obtained from the infrared cameras 102, normally two positive edge lines or negative edge lines representing two human legs are detected in the second area, however, by considering the length of the respective positive edge lines, it is possible to identify a human and the other objects even though three or more than three positive edge lines are detected. Thereby, even in the case where additional positive edge lines, other than the two positive edge lines representing two human legs, are detected according to a reason that a building or the like is visible from a clearance between the two legs in the image, it is possible to identify a human and the other objects with high accuracy.

Furthermore, in the case where the second condition, two edge lines with the length in the second length range and with a deviation between the upper horizontal interval and the lower horizontal interval in the given deviation range with a positive lower limit are extracted in the second area $A_{2i}$, is satisfied, the object is identified as a human. Accordingly, it is possible to identify a human and the other objects with high precision by considering the following aspects: (1) a human has two legs; (2) standard length of a human leg; and (3) when a human is viewed from a front side, with respect to human legs, a distance in a lower position tends to be narrower than that in an upper position.

Moreover, in the case where the third condition, two peak luminance lines having the horizontal interval in the given interval range are extracted in the second area $A_{2i}$, is satisfied, the object is identified as a human. Accordingly, it is possible to identify a human and the other objects with high accuracy by considering the interval between two peak luminance lines and the standard interval between two human legs.

Furthermore, in the case where the object is identified as a human, the contact possibility between the object and the vehicle 1 is determined, thereafter, based on the determined result, appropriate process is performed (refer to S040 in FIG. 3). Since the object can be identified as a human with high accuracy in the above mentioned way, it is possible to control a vehicle apparatus appropriately from a view point of avoiding contacting the human and the like.

Although human legs have been identified as a part of the object in the above mentioned embodiment, as another embodiment, it is preferred to set two wrists or the other parts of a human as a part of the object based on a similar consideration to the case where two human legs are set as a part of the object.

In the above mentioned embodiment, a pair of infrared cameras 102 is mounted on the vehicle 1 for obtaining an image, and the object or a position of an area of high luminance in real space is determined by using the disparity of the pair of infrared cameras 102. As another embodiment, it is possible to mount on the vehicle 1 one infrared camera 102, a radar or a supersonic distance measuring system, wherein the image is obtained from the one infrared camera 102 and the position of the object in real space or the distance from the vehicle 1 to the object is measured by the distance measuring system.

Figure 8C:
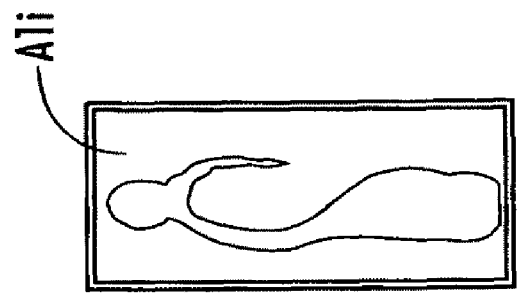
FIGS. 8(a) to 8(c) are explanatory diagrams illustrating another method to set the first area.
Figure 8B:
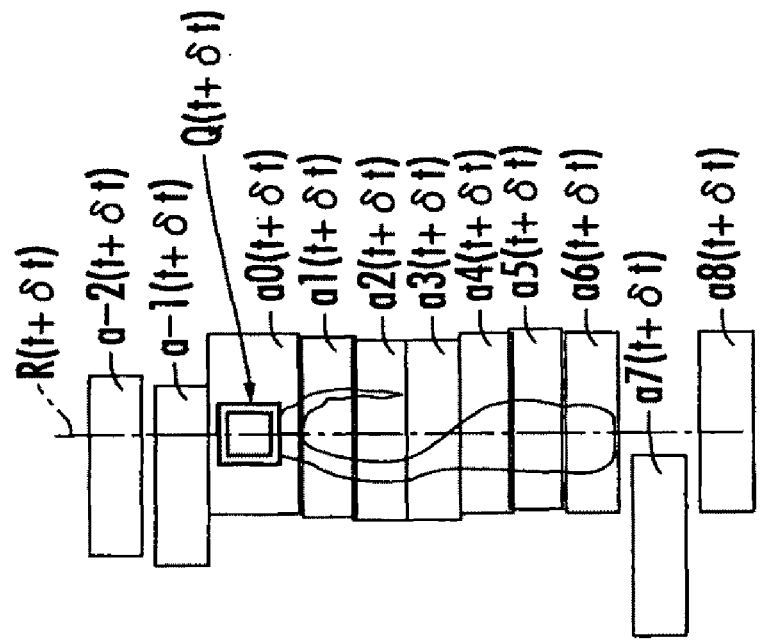
Figure 8A:
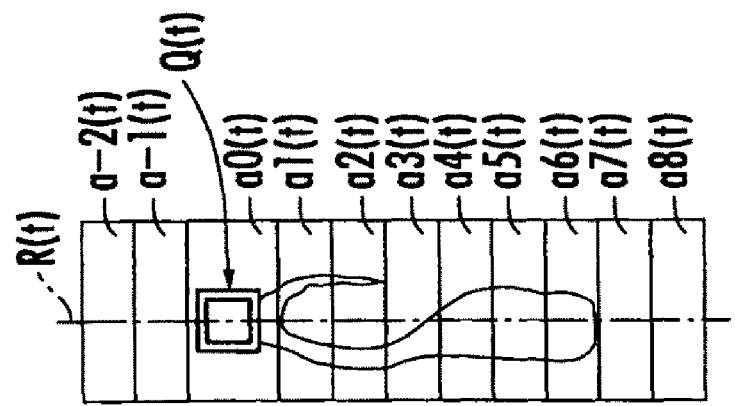

In the above mentioned embodiment, after a distance of the respective area of high luminance contained in each of the small areas $a_k$ has been determined, a collection of a plurality of continuous small areas $a_k$, each having the determined distance within a universal distance range is set as the first area $A_{1i}$ (refer to FIG. 4(c)). As another embodiment, it is also possible to set as the first area $A_{1i}$ a collection of small areas $a_k$, which behave in a same way to the area Q of high luminance (refer to FIG. 4(a)), in the image obtained from the one infrared camera 102 at different timings of t and t+δt (δt>0). In detail, as illustrated in FIG. 8(a), in the image at timing t, a plurality of small areas (mask) $a_k(t)$ (k=−2 to 8) centered at a vertical line R(t) which is represented by a chain line and passes the gravity of center of the area of high luminance Q(t) are set. Further, according to a pattern matching by correlation calculation, as illustrated in FIG. 8(b), in the image at timing t+δt, a plurality of small areas $a_k(t+\delta t)$ corresponding to the small areas $a_k(t)$ at timing t are set. Thereafter, an area containing a collection of small areas $a_j(t+\delta t)$ (j=0 to 6) which have centers thereof in a narrow range in the horizontal direction around a vertical line R(t+δt) which is represented by a chain line and passes the gravity of center of the area of high luminance Q(t+δt) are set as the first area $A_{1i}$ as illustrated in FIG. 8(c). In addition, a distance from the vehicle 1 to the object contained in the first area $A_{1i}$ may be determined on the basis of a variation rate on the respective area dimension of the object in the image at timings t and t+δt.

According to this method, even though the distance measuring system using supersonic waves and radar is not mounted on the vehicle 1, the first area $A_{1i}$ may be set if one imaging unit (infrared camera or the like) is mounted on the vehicle 1. Additionally, based on the variation rate on size (vertical size, horizontal size or area) of the extracted object (the area of high luminance) in the image obtained from the one imaging unit at different timings, it is possible to determine a distance from the vehicle 1 to the object.

In the above mentioned embodiment, the infrared camera 102 is mounted on the vehicle 1 as the imaging unit, as another embodiment, it is also possible to mount on the vehicle 1 an imaging unit sensitive to electromagnetic waves with various wavelength, such as a near-infrared camera, an optical camera (a CCD camera, etc.) or the like.

In the above mentioned embodiment, the first or the second information indicating the existence of the object based on the evaluation on the contact possibility between the vehicle 1 and the object is displayed on HUD 104, as another embodiment, it is also possible to control the vehicle 1 or vehicular apparatuses such as a steering system, a brake system and others based on the evaluation on the contact possibility. According to the automotive environment monitoring device 10 of this configuration, the vehicular apparatuses are controlled on the basis of the contact possibility between the vehicle 1 and the object thus identified with high accuracy, and accordingly, the vehicle 1 is appropriately controlled via deceleration, steering or the like from the viewpoint of avoiding the contact between the vehicle 1 and the object.

Although the present invention has been explained in relation to the preferred embodiments and drawings but not limited, it should be noted that other possible modifications and variations made without departing from the spirit and scope of the invention will be comprised in the present invention. Therefore, the appended claims encompass all such changes and modifications as falling within the gist and scope of the present invention.

What is claimed is:

1. An automotive environment monitoring device which monitors environment of a vehicle by using an image obtained from an imaging unit mounted on the vehicle, comprising:
    a first processing unit which sets an area where an object exists in the image obtained from the imaging unit as a first area and a lower portion of the first area as a second area;
    a second processing unit which extracts a positive or negative edge line, and a length of each of the positive or negative edge line of the object in the second area set by the first processing unit as a feature of the object in the second area set by the first processing unit; and
    a third processing unit which identifies the object as a human on a condition that at least three positive or negative edge lines with the length in a first length range are extracted by the second processing unit on the basis of an extraction result by the second processing unit.

2. The automotive environment monitoring device according to claim 1, wherein the first processing unit determines a distance from the vehicle to the object; and the second processing unit extracts the feature of the object on a condition that the determined distance by the first processing unit is in a given distance range.

3. The automotive environment monitoring device according to claim 1, wherein the first processing unit determines a height from a road surface to the lower end of the first area or the second area set by the first processing unit where the object exists; and the second processing unit extracts the feature of the object on a condition that the determined height by the first processing unit is in a given height range.

4. An automotive environment monitoring program stored on a non-transitory computer readable medium which causes a computer mounted on a vehicle to serve as the automotive environment monitoring device according to claim 1.

5. An automotive environment monitoring device which monitors environment of a vehicle by using an image obtained from an imaging unit mounted on the vehicle, comprising:
    a first processing unit which sets an area where an object exists in the image obtained from the imaging unit as a first area and a lower portion of the first area as a second area;
    a second processing unit which extracts an edge line, a length of the edge line, and an upper horizontal interval and a lower horizontal interval between two edge lines of the object in the second area set by the first processing unit as the feature of the object in the second area set by the first processing unit; and
    a third processing unit which identifies the object as a human on a condition that two edge lines with the length in a second length range and with a deviation between the upper horizontal interval and the lower horizontal interval in a given deviation range with a positive lower limit are extracted by the second processing unit on the basis of an extraction result by the second processing unit.

6. An automotive environment monitoring device according to claim 5, wherein the second processing unit determines a total number of edge points constituting the two edge lines as the length of the two edge lines, respectively; and an average horizontal interval between edge points of the same height constituting the two edge lines in the upper and lower portion of the second area are determined as the upper horizontal interval and the lower horizontal interval of the two edge lines, respectively.

7. An automotive environment monitoring program causing a computer mounted on a vehicle to serve as the automotive environment monitoring device according to claim 5.

8. An automotive environment monitoring method which monitors environment of a vehicle by using an image obtained from an imaging unit mounted on the vehicle, comprising:
    a first processing which sets an area where an object exists in the image obtained from the imaging unit as a first area and a lower portion of the first area as a second area;
    a second processing which extracts a positive or negative edge line, and a length of each of the positive or negative edge line of the object in the second area set by the first processing as a feature of the object in the second area set by the first processing; and
    a third processing which identifies the object as a human on a condition that at least three positive or negative edge lines with the length in a first length range are extracted by the second processing on the basis of an extraction result by the second processing.

9. An automotive environment monitoring method which monitors environment of a vehicle by using an image obtained from an imaging unit mounted on the vehicle, comprising:
    a first processing which sets an area where an object exists in the image obtained from the imaging unit as a first area and a lower portion of the first area as a second area;
    a second processing which extracts an edge line, a length of the edge line, and an upper horizontal interval and a lower horizontal interval between two edge lines of the object in the second area set by the first processing as the feature of the object in the second area set by the first processing; and
    a third processing which identifies the object as a human on a condition that two edge lines with the length in a second length range and with a deviation between the upper horizontal interval and the lower horizontal interval in a given deviation range with a positive lower limit are extracted by the second processing on the basis of an extraction result by the second processing.

* * * * *